US008438634B2

(12) United States Patent
Coan

(10) Patent No.: US 8,438,634 B2
(45) Date of Patent: May 7, 2013

(54) COMMUNICATING SECURITY CREDENTIALS BETWEEN CICS REGIONS

(75) Inventor: Peter Coan, Batavia, IL (US)

(73) Assignee: CA, Inc., Islandia, NY (US)

(*) Notice: Subject to any disclaimer, the term of this patent is extended or adjusted under 35 U.S.C. 154(b) by 675 days.

(21) Appl. No.: 12/475,129

(22) Filed: May 29, 2009

(65) Prior Publication Data
US 2010/0306835 A1 Dec. 2, 2010

(51) Int. Cl.
G06F 21/31 (2006.01)

(52) U.S. Cl.
USPC ............... 726/18; 726/2; 726/7; 705/325

(58) Field of Classification Search ............... 726/2, 7; 705/325
See application file for complete search history.

(56) References Cited

U.S. PATENT DOCUMENTS

| 5,305,456 | A | * | 4/1994 | Boitana | 726/20 |
| 5,349,657 | A | * | 9/1994 | Lee | 717/125 |
| 5,872,971 | A | * | 2/1999 | Knapman et al. | 718/101 |
| 6,216,164 | B1 | * | 4/2001 | Zaremba, Jr. | 709/227 |
| 6,324,563 | B1 | * | 11/2001 | Hotea et al. | 718/104 |
| 6,334,144 | B1 | * | 12/2001 | Horwitz | 709/213 |
| 6,442,568 | B1 | * | 8/2002 | Velasco et al. | 1/1 |
| 6,560,609 | B1 | * | 5/2003 | Frey et al. | 1/1 |
| 8,046,441 | B2 | * | 10/2011 | Banerji et al. | 709/220 |
| 8,296,772 | B2 | * | 10/2012 | Bulfin | 718/105 |
| 2003/0097574 | A1 | * | 5/2003 | Upton | 713/183 |
| 2004/0034719 | A1 | * | 2/2004 | Peterson et al. | 709/250 |
| 2006/0167999 | A1 | * | 7/2006 | Clark et al. | 709/204 |
| 2007/0011194 | A1 | * | 1/2007 | Gurevich | 707/103 Y |
| 2007/0094416 | A1 | * | 4/2007 | Goldstein et al. | 709/253 |
| 2008/0209392 | A1 | * | 8/2008 | Able et al. | 717/105 |
| 2008/0256552 | A1 | * | 10/2008 | Purpura | 719/312 |
| 2009/0013327 | A1 | * | 1/2009 | Bulfin | 718/105 |
| 2009/0077269 | A1 | * | 3/2009 | Goldstein et al. | 709/253 |
| 2010/0014657 | A1 | * | 1/2010 | Kerschbaum et al. | 380/28 |
| 2010/0146396 | A1 | * | 6/2010 | Able et al. | 715/735 |
| 2010/0257360 | A1 | * | 10/2010 | Bae et al. | 713/168 |

FOREIGN PATENT DOCUMENTS
WO WO 9724664 A1 * 7/1997

OTHER PUBLICATIONS

W. Voss, "APPC/MVS Distributed Application Support," 1992, IBM Systems Journal, vol. 31, No. 2, pp. 381-405.*
Bainbridge et al., "CICS and Enterprise JavaBeans," 2001, IBM Systems Journal, vol. 40, No. 1, pp. 46-66.*
M. Yelavich, "Customer Information Control System—An Evolving System Facility," 1985, IBM Systems Journal, vol. 24, Nos. 3/4, pp. 264-278.*
K. Deinhart, "SAA Distributed File Access to the CICS Environment," 1992, IBM Systems Journal, vol. 31, No. 3, pp. 516-533.*

* cited by examiner

Primary Examiner — Luu Pham
(74) Attorney, Agent, or Firm — Schwegman Lundberg & Woessner, P.A.

(57) ABSTRACT

Various embodiments include at least one of systems, methods, software, and data structures for communicating security credentials between Customer Information Control System (CICS) regions in a container of a CICS channel data structure. Some embodiments include receiving a dataset from a first CICS application executing within a first CICS region, the dataset received from the first CICS application for transmission to a second CICS application in a second CICS region. When the dataset includes a channel data, populating a container of the channel data with credential data to authenticate the dataset within the second CICS region and forwarding the dataset to a CICS transformer process of the first CICS region to transform and communicate the dataset to the second application in the second CICS region.

16 Claims, 6 Drawing Sheets

COMMUNICATING SECURITY CREDENTIALS BETWEEN CICS REGIONS

TECHNICAL FIELD

The subject matter herein relates to data processing and, more particularly, communicating security credentials between Customer Information Control System (CICS) regions.

BACKGROUND INFORMATION

Security technology in enterprise-class data processing, such as data processing that is performed through use of mainframe computers, often includes transaction processing computing environments that utilize a plurality of Customer Information Control System (CICS) regions. Each CICS region is typically instantiated for online, real-time transaction processing. It is also common for a task that executes in one CICS region to access data or processes of another region. In such instances, although the user, be it a human or logical user, is authenticated in a first region, the user must also be identified in the other region, either through inheritance of security credentials from the first region or by re-authentication in the second region. Thus, when exchanging transactions between CICS regions, with the ACF2™ CICS interface, security credentials utilized in a first region to authenticate the user may be included in cross-region data communications.

Current ACF2™ technology, in use since the 1980's, causes CICS control blocks sent between CICS regions or address spaces, such as in Terminal Input/Output Areas (TIOAs), to be altered to include ACF2™ security data to identify the user. These data additions on the sending CICS region side and extractions on the receiving CICS region side occur during Event Notification Facility (ENF) CICS-driven events at entry to and exit from the CICS transformer process when CICS transaction routing or function request shipping occurs. On the sending side, the data additions occur after the transformer process and on the receiving side, the data extractions occur before the transformer process. However, such manipulations of the TIOA data structures can interfere with CICS processing resulting loss of ACF2™ data and CICS processing errors. As a result, abnormal ending (abends) can occur due to presence of foreign or corrupt data.

SUMMARY

Various embodiments include at least one of systems, methods, software, and data structures for communicating security credentials between CICS regions in a container of a Customer Information Control System (CICS) channel data structure. Some embodiments include receiving a dataset from a first CICS application executing within a first CICS region, the dataset received from the first CICS application for transmission to a second CICS application in a second CICS region. When the dataset includes a channel data, populating a container of the channel data with credential data to authenticate the dataset within the second CICS region and forwarding the dataset to a CICS transformer process of the first CICS region to transform and communicate the dataset to the second application in the second CICS region.

Some such embodiments, and others, further include receiving a dataset in the second CICS region addressed to the second CICS application. In such embodiments, when the dataset includes a channel data and the channel data includes a container holding credential data, credential data is extracted from the credential container and the user is authenticated using the credential data. The credential container is then removed from the channel data and the received dataset is passed to the second application.

DETAILED DESCRIPTION

Various embodiments include at least one of systems, methods, software, and data structures for communicating security credentials, such as ACF2™ data, between CICS regions in a container of a Customer Information Control System (CICS) channel data structure. In such embodiments, the container holding credential data is added prior to the CICS transformer process when sending data to another CICS region and the container is removed after the CICS transformer process when receiving data from another CICS region. This is contrary to existing solutions where credential data is added after the transformer process when sending CICS data and removed before the transformer process when receiving CICS data.

Through use of a credential data container, the need to modify a CICS-owned data structure between the sending and receiving CICS transformer processes is eliminated. As a result, risks associated with modifying the CICS-owned data-structure are not only mitigated, but also eliminated. The credential data container in the channel, when processed by the sending and receiving transformer processes, is simply ignored and thus, will not disrupt operation of the transformer processes. Such embodiments retain the full flexibility and performance of traditional credential inheritance in the CICS environment and User IDs need not be redefined between regions. These and other embodiments are described with reference to the figures.

Figure 1:
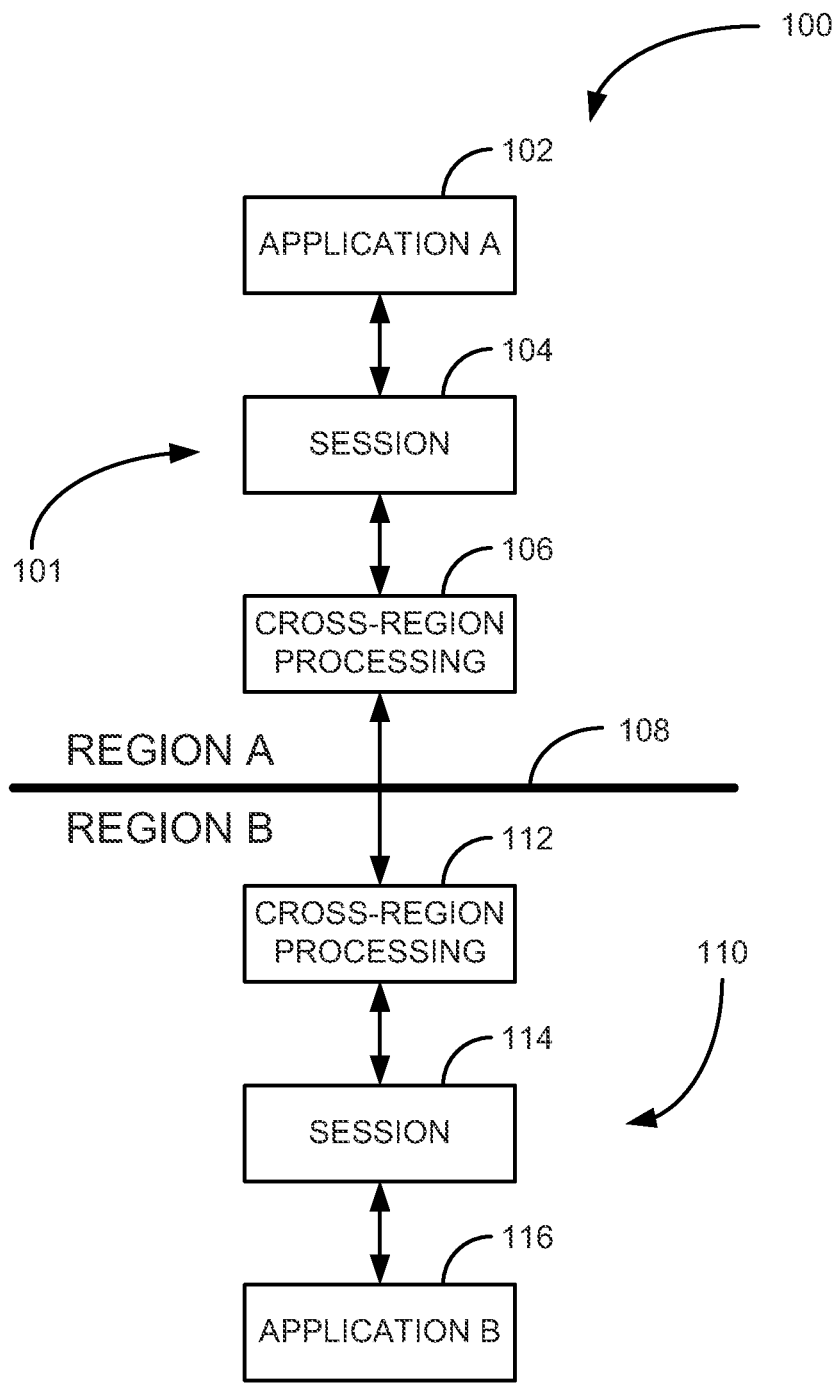
FIG. 1 is a logical block diagram of a system according to an example embodiment.

FIG. 1 is a logical block diagram of a system 100 according to an example embodiment. The system 100 includes CICS region A 101 and CICS region B 110. CICS regions A 101 and B 110 each are instantiated in respective computing environments, such as CICS instantiated within a z/OS operating system with one or more CICS regions instantiated therein. The z/OS operating system and CICS are developed by IBM Corporation and typically execute upon a mainframe computing platform.

CICS regions A 101 and B 110 communicate over a data communication medium 108. CICS regions A 101 and B 110 may be CICS instances on the same computing platform and the data communication medium 108 in such instances is logical in nature as the hardware resources between the CICS regions A 101 and B 110 are shared. In other embodiments, the CICS regions A 101 and B 110 are CICS instances on different computing platforms. The data communication medium 108 in such embodiments typically includes a network, which includes one or more of a Local Area Network (LAN), System Area Network (SAN), and the Internet.

CICS region A 101 includes CICS application A 102 and CICS region B 110 includes CICS application B 116. The CICS applications A 102 and B 116 are typically transaction processing application which may be written in any of numerous programming languages, such as COBOL, C/C++, Assembly, Java, and others. The CICS applications A 102 and B 116 may be developed for any number of purposes, such as providing system 100 functionality to human users through terminals and database access to human or logical users, among others.

When a user interacts with CICS applications A 102 and B 116, a processing session 104, 114 is instantiated in a thread-like manner. The user associated with a respective session 104, 114 is authenticated according to user credentials, such as ACF2™-type user security credentials. The ACF2™ security program was developed by CA Inc. While executing, CICS applications A 102 and B 116 often communicate of the data transmission medium 108 to request and provide data. The sessions 104, 114 communicate over the data transmission medium 108 by routing communications through cross-region processing modules 106, 112. The cross-region processing modules 106, 112 include a CICS transformer program that is part of CICS and is operable to format data, in a protocol type manner, for transmission over the data transmission medium between CICS session A 101 and B 110. However, the user is authenticated in only one region. To allow a session to be initiated with regard to an application in another CICS instance, user credential data is provided.

As mentioned above, provisioning of user credential data has included modification of Terminal Input/Output Areas (TIOAs) of data after it has passed through the transformer process to include credential data and removal of the credential data in the receiving region prior to the transformer process unwrapping a received communication. This has facilitated User ID inheritance in the receiving region, but has lead to issues with data corruption and introduction of foreign data into CICS owned data structures resulting abends.

According to some embodiments, when the data from a CICS application is to be sent to another CICS region and the data is in the form of a CICS channel data structure including one or more containers of data, a container with the user credential data is added to the channel. The channel data structure, augmented with the container holding the user credential data, is then sent to the CICS transformer process and communicated over the data transmission medium. In such channel/container embodiments when sending data to another region compared to instances where TIOA data is modified, adding the user credential data to a container is performed on the frontend of the transformer process, while TIOA data modification is performed on the backend of the transformer process.

Conversely, when data is received into a CICS region from another CICS region and the user credential data is held in a container of a received channel data structure, the channel is processed by the transformer process and subsequently, the user credential data in the container is read and the container is removed from the channel. On the received end, the processing of the user credential is performed on the backend of the transformer process in contrast to the TIOA-type embodiments where the user credential data is read and removed from the received data prior to the transformer process.

Figure 2:
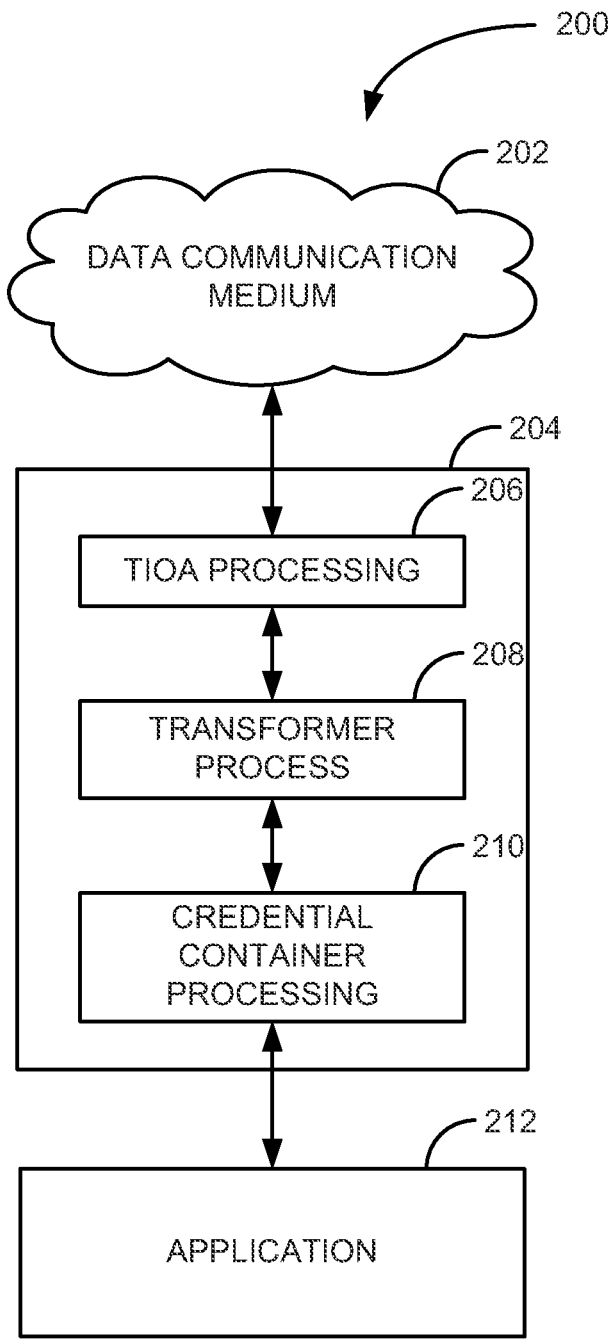
FIG. 2 is a logical block diagram of a system according to an example embodiment.

FIG. 2 is a logical block diagram of a system 200 according to an example embodiment. The system 200 includes a data communication medium 202, a cross-region processing module 204, and a CICS application 212. The data communication medium 202 is a medium capable of carry data between CICS regions, such as is illustrated and described with regard to the data communication medium 108 of FIG. 1.

The cross-region processing module 204 is an example embodiment of the cross-region processing modules 106, 112 of FIG. 1. The cross-region processing module includes a TIOA processing module 206, a CICS transformer process 208 that is included in CICS, and a credential container processing module 210. The TIOA processing module 206 is operable to add user credential data to TIOA portions of data received from the transformer process 208 that do not include user credential data in a CICS container channel and to remove and utilize user credential data included in a TIOA of data received from another CICS region received over the data communication medium. The credential container processing module 210 is operable to add a container including user credential data to a CICS channel data structure when data from an application is received for transmission to another CICS region and to remove and utilize user credential data from a channel CICS channel data structure originating in another CICS region received from the transformer process 208. Further example of the operation of the cross-region processing module 204, the TIOA processing module 206, and the credential container processing module 210 are illustrated and described with regard to FIG. 3 and FIG. 4.

Although the TIOA processing module 206, CICS transformer process 208, and credential container processing module 210 are illustrated within the cross-region processing module 204, this grouping is illustrated and described in such a manner for descriptive purposes. Thus, although in some embodiments the CICS transformer process 208, and credential container processing module 210 are included in the cross-region processing module 204, in other embodiments, the cross-region processing module 204 is a logical module that does not exist as a single processing program.

Figure 3:
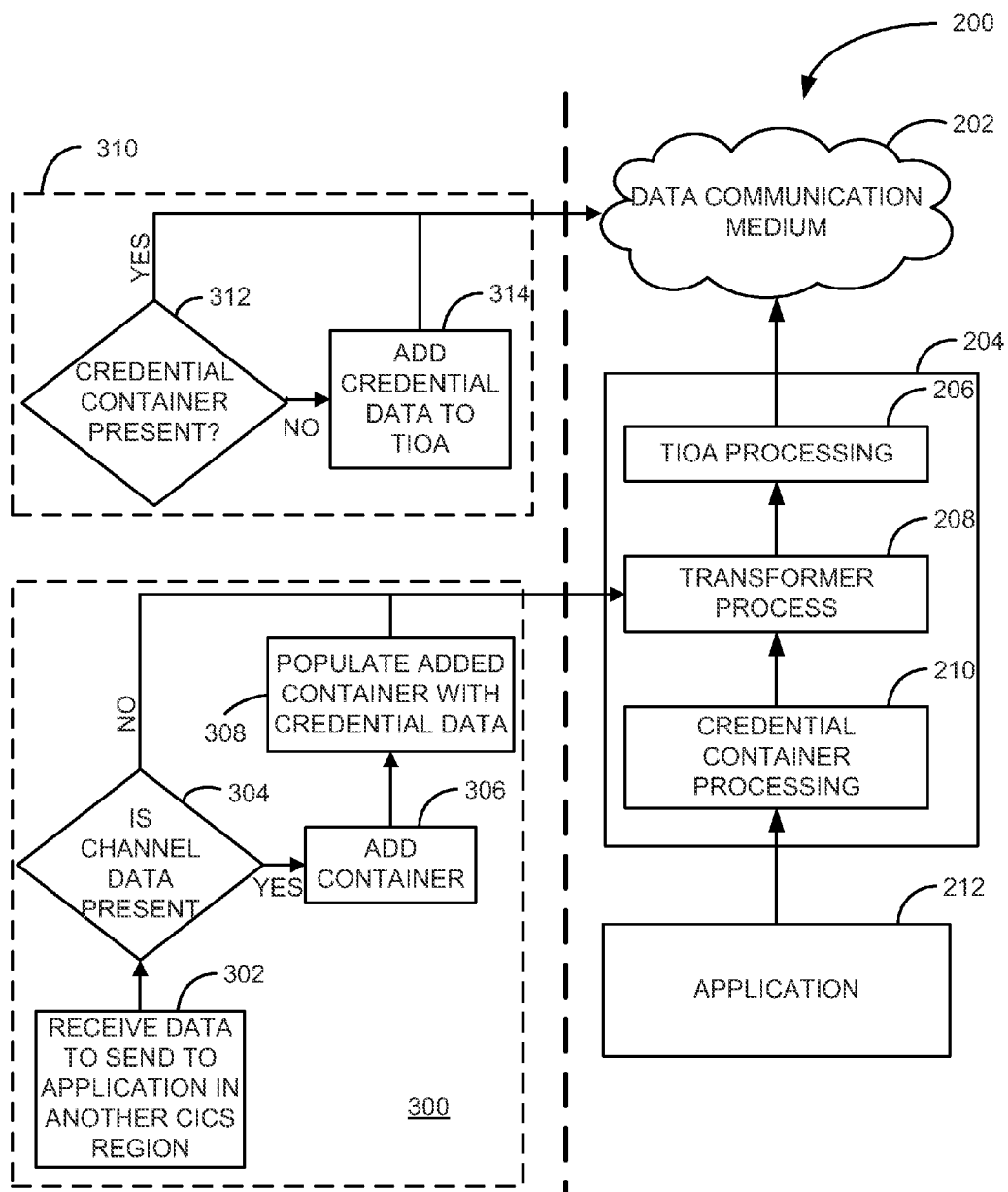
FIG. 3 is a block flow diagram of methods, with reference to the system of FIG. 2, according to an example embodiment.

FIG. 3 is a block flow diagram of methods 300, 310, with reference to the system 200 of FIG. 2, according to an example embodiment. The methods 300, 310 are examples of methods that are performed by the credential container processing module 210 and TIOA processing module 206, respectively, when data is to be sent from the application in the CICS region to another CICS region over the data communication medium 202.

As mentioned above, the method 300 is an example method that is performed by the credential container processing module 210. The method 300 includes receiving 302 data from the CICS application 212 to be sent to an application in another CICS region and determining 304 if channel data is present. The receiving 302 of the data from the CICS application 212 typically includes monitoring data inbound to the transformer process 208 and processing that data in the credential container processing module 210 prior to the data being processed by the transformer process 208. The determining 304 may include invoking a CICS service to perform the determination 304, such as by invoking the INQUIRE_BOUND_CHANNEL and INQUIRE_CHANNEL_BY_TOKEN functions of the channel services manager of CICS. If channel data is present, a container is added 306 to the channel and the added 306 container is populated with credential data of the CICS application 212 user. The container may be added 206 and populated 308 by invoking the PUT_CONTAINER function of the container services manager of CICS. Then the data, augmented with the populated credential data container, is forwarded to the transformer process 208. In instances where the determination 304 is that channel data is not present in the received 302 data, the received 304 data is simply forwarded to the transformer process 208.

As mentioned above, the method 310 is an example method that is performed by the TIOA processing module 206. The method 310 includes receiving data from the transformer process 208 and determining 312 if a credential container is present. If the credential container is present, the data received from the transformer process is forwarded to the other CICS region over the data communication medium 202. When the received data is determined 312 to not include a credential data container, the method 310 includes adding 314 user credential data to a TIOA of the data and forwarding the received data, augmented with the user credential data, to the other CICS region over the data communication medium 202. In some embodiments, the forwarding may include transmitting data, while in other embodiments, the forwarding may include placing data in a memory location or processing stream to be read by another process that may be monitoring the memory location or processing stream.

Figure 4:
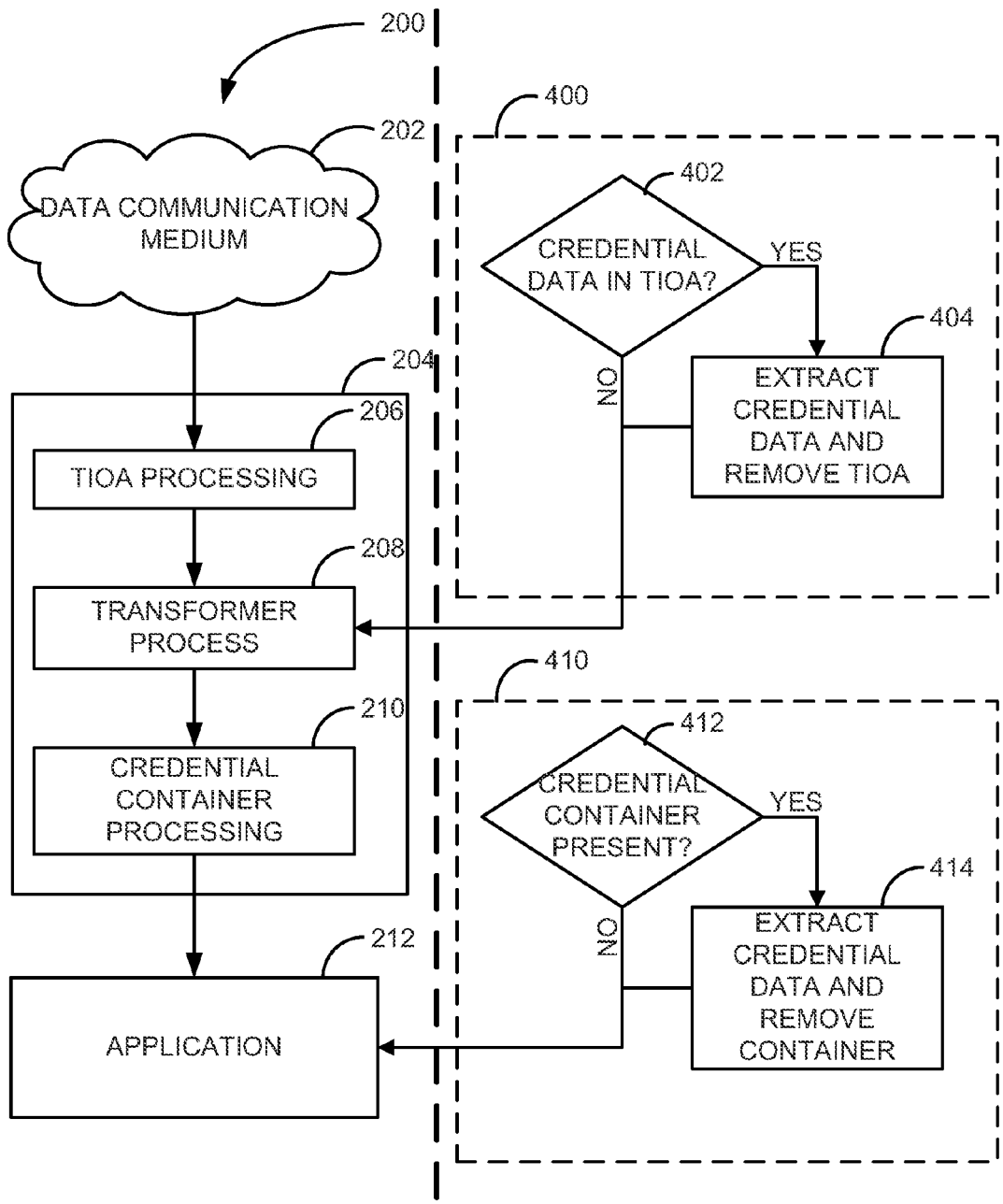
FIG. 4 is a block flow diagram of methods, with reference to the system of FIG. 2, according to an example embodiment.

FIG. 4 is a block flow diagram of methods 400, 410, with reference to the system 200 of FIG. 2, according to an example embodiment. The methods 400, 410 are examples of methods that are performed by the TIOA processing module 206 and the credential container processing module 210, respectively, when data is received into a CICS region from another CICS region over the data communication medium 202.

As mentioned above, the method 400 is an example method that is performed by the TIOA processing module 206. The method 400 includes receiving data over the communication medium 202 and determining 402 if credential data is included in a TIOA of the received data. When credential data is included, the method 400 includes extracting 404 credential data and removing the TIOA holding the credential data from the received data. The modified data is then forwarded to the transformer process 208. If it is determined 402 that credential data is not included in a TIOA of the received data, the received data is simply forwarded to the transformer process 208.

As mentioned above, the method 410 is an example method that is performed by the credential container processing module 210. The method 410 includes receiving data from the transformer process 208 addressed to the application 212. The method 410 determines 412 if the received data includes a credential container, such as by invoking the INQUIRE_ BOUND_CHANNEL and INQUIRE_CHANNEL_BY_ TOKEN functions of the channel services manager of CICS. When a credential container is present, the credential data is extracted 414 and used to authenticate the user. The credential data may be extracted 414 by invoking GET_CONTAINER_ SET function of the CICS container services manager. The credential container is then removed from the received data, which is then forwarded on to the application 212. The credential container may be removed by invoking the INQUIRE_CHANNEL_BY_TOKEN and DELETE_CON- TAINER functions of the CICS container service manager. When it is determined 412 that the data received from the transformer process does not include a credential container, the method 410 forwards the received data to the application 212.

Figure 5:
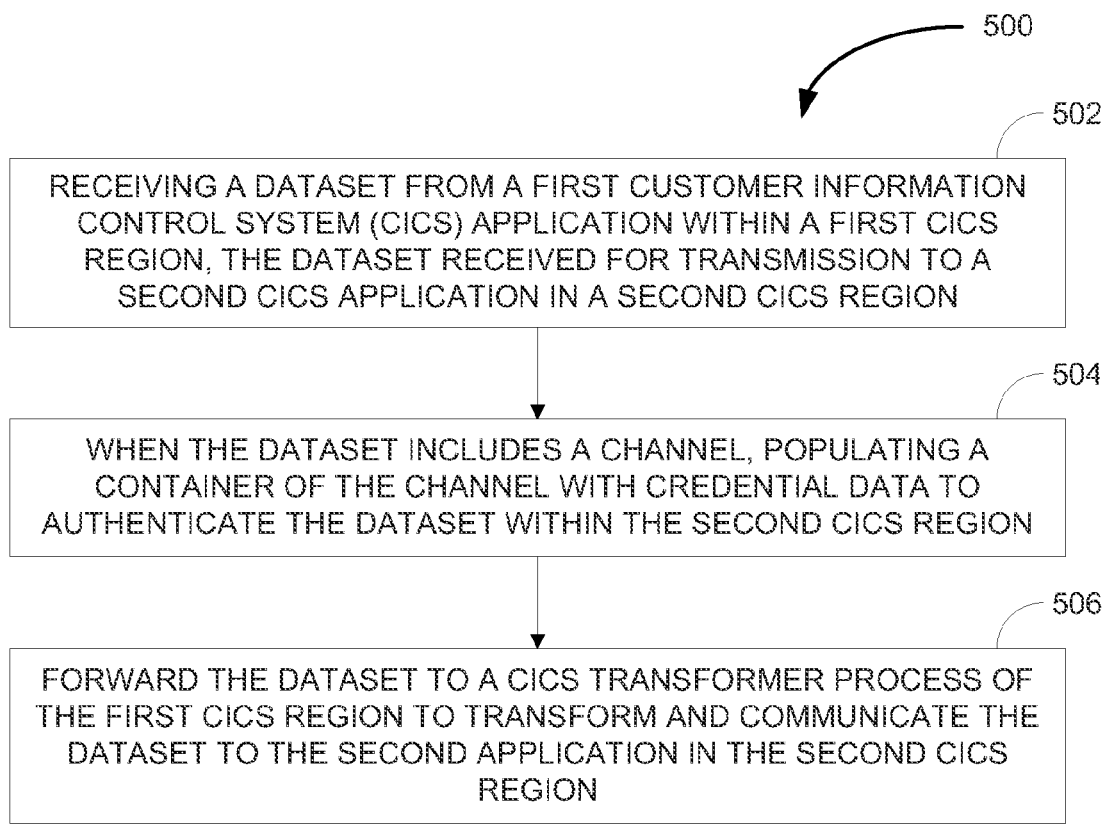
FIG. 5 is a block flow diagram of a method according to an example embodiment.

FIG. 5 is a block flow diagram of a method 500 according to an example embodiment. The method 500 is an example method that may be performed within a CICS region when processing data in one CICS region to be sent to another CICS region to allow user credentials from the first CICS region to be inherited in the other CICS region. The method 500 includes receiving 502 a dataset from a first CICS application executing on the hardware computing platform and within a first CICS region, the dataset received from the first CICS application for transmission to a second CICS application in a second CICS region. When the received 502 dataset includes a channel, the method 500 includes populating 504 a container of the channel with credential data to authenticate the dataset within the second CICS region. The method 500 then forwards 506 the dataset to a CICS transformer process of the first CICS region to transform and communicate the dataset to the second application in the second CICS region. In some such embodiments, the dataset is received 502 and stored in a memory of the hardware computing platform and the populating 504 of the container with credential data includes at least one memory operation performed on the dataset stored in the memory. Further, the forwarding 506 of the dataset to the CICS transformer process includes a memory operation to read the dataset from the memory,into the CICS transformer process.

In some embodiments of the method 500, wherein populating 504 the container of the channel with credential data includes adding the container to be populated. Further, populating 504 the container may include populating at least two containers with data.

Some embodiments of the method 500, and other embodiments, further include receiving a dataset in the second CICS region addressed to the second CICS application. In such embodiments, when the dataset includes a channel and the channel data includes a container holding credential data, the method 500 includes extracting the credential data from the credential container and authenticating the user using the credential data. The credential container is then removed from the channel and the received dataset is passed to the second application.

Figure 6:
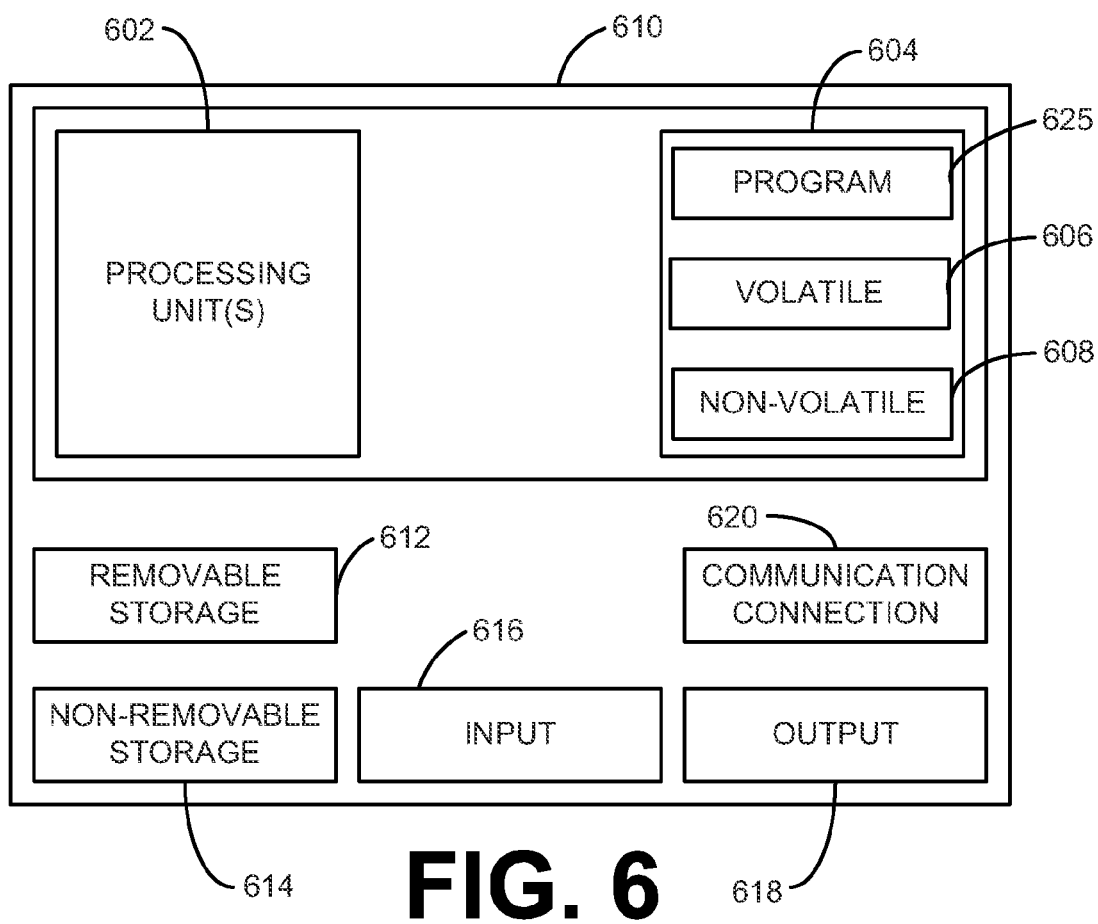
FIG. 6 is a block diagram of a computing device according to an example embodiment.

FIG. 6 is a block diagram of a computing device according to an example embodiment. In one embodiment, multiple such computer systems are utilized in a distributed network to implement multiple components in a transaction-based environment. One example computing device in the form of a computer 610, such as a mainframe computer, may include at least processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 may include or have access to a computing environment that includes input 616, output 618, and a communication connection 620. The computer 610 may operate in a networked environment using a communication connection to connect to one or more remote computers, such as database servers and terminal computing devices. The communication connection may include a Local Area Network (LAN), a Wide Area Network (WAN), a System Area Network (SAN), the Internet, and other networks.

Computer-readable instructions stored on a computer-readable medium are executable by the at least one processing unit 602 of the computer 610. A hard drive, CD-ROM, and RAM are some examples of articles including a computer-readable medium. For example, a computer program 625 capable of performing one or more of the methods described herein to augment CICS application data with user credentials to facilitate user authentication between CICS regions.

The functions or algorithms described herein are implemented in hardware, software or a combination of software and hardware in one embodiment. The software comprises computer executable instructions stored on computer readable medium such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   receiving, on a hardware computing platform, a dataset from a first Customer Information Control System (CICS) application executing on the hardware computing platform and within a first CICS region, the dataset received from the first CICS application for transmission to a second CICS application in a second CICS region;
   when the dataset includes channel data, populating a container of the channel data with credential data to authenticate the dataset within the second CICS region;
   forwarding the dataset to a CICS transformer process of the first CICS region to transform and communicate the dataset to the second application in the second CICS region;
   receiving the dataset in the second CICS region addressed to the second CICS application; and
   when the dataset received in the second CICS region includes channel data and the channel data includes a container holding credential data:
   extracting the credential data from the credential container and authenticate the credential data;
   removing the credential container from the channel data; and
   passing the dataset to the second CICS application.

2. The method of claim 1, wherein:
   the dataset is received and stored in a memory of the hardware computing platform;
   populating the container with credential data includes at least one memory operation performed on the dataset stored in the memory; and
   forwarding of the dataset to the CICS transformer process includes a memory operation to read the dataset from the memory into the CICS transformer process.

3. The method of claim 1, wherein the second CICS region executes on the same hardware computing platform as the first CICS region.

4. The method of claim 1, wherein populating the container of the channel data with credential data includes adding the container to be populated.

5. The method of claim 1, wherein populating the container includes populating at least two containers with data.

6. The method of claim 1, wherein the hardware computing platform is a mainframe computer.

7. A computer-readable storage device, with instructions stored thereon, which when executed by a computer, cause the computer to:
   receive a dataset from a first Customer Information Control System (CICS) application executing on the computer and within a first CICS region, the dataset received from the first CICS application for transmission to a second CICS application in a second CICS region;
   when the dataset includes channel data, populate a container of the channel data with credential data to authenticate the dataset within the second CICS region;
   forward the dataset to a CICS transformer process of the first CICS region to transform and communicate the dataset to the second application in the second CICS region;
   receive the dataset in the second CICS region addressed to the second CICS application; and
   when the dataset received in the second CICS region includes channel data and the channel data includes a container holding credential data:
   extract the credential data from the credential container and authenticate the credential data;
   remove the credential container from the channel data; and
   pass the dataset to the second application.

8. The computer-readable storage device of claim 7, wherein:
   receiving the dataset includes storing the dataset in a memory of the computer;
   populating the container with credential data includes at least one memory operation performed on the dataset stored in the memory; and
   forwarding the dataset to the CICS transformer process includes a memory operation to read the dataset from the memory into the CICS transformer process.

9. The computer-readable storage device of claim 7, wherein the second CICS region executes on the computer.

10. The computer-readable storage device of claim 7, wherein populating the container of the channel data with credential data includes adding the container to be populated.

11. The computer-readable storage device of claim 7, wherein populating the container includes populating at least two containers with data.

12. A system comprising:
    at least one processor and at least one memory device coupled via at least one electrical interconnect;
    an operating system stored on the at least one memory device and executable by the processor;
    a Customer Information Control System (CICS) program stored on the at least one memory device and executable in at least two region instances by the at least one processor within a computing environment of the operating system;
    a security data process stored on the at least one memory device and executable by the at least one processor within a computing environment of the operating system to:

receive a dataset from a first CICS application executable within a first CICS region, the dataset received from the first CICS application for transmission to a second CICS application in a second CICS region;

when the dataset includes channel data, add a container and populate the added container with credential data to authenticate the dataset within the second CICS region; and forward the dataset to a CICS transformer process of the first CICS region to transform and communicate the dataset to the second application in the second CICS region;

receive the dataset in the second CICS region addressed to the second CICS application; and when the dataset received in the second CICS region includes channel data and the channel data includes a container holding credential data:

extract the credential data from the credential container and authenticate the credential data;

remove the credential container from the channel data; and pass the dataset to the second CICS application.

13. The system of claim 12, wherein the second CICS region is a CICS region on a different system accessible via a network.

14. The system of claim 12, wherein populating the container of the channel data with credential data includes adding the container to be populated.

15. A method comprising:

receiving, on a hardware computing platform, a dataset in a Customer Information Control System (CICS) instance intended for a target CICS application in a CICS region, the received dataset having originated by another CICS application in another CICS region; and when the dataset in the CICS region includes channel data and the channel data includes a container holding credential data:

extracting the credential data from the credential container and authenticate the credential data;

removing the credential container from the channel data; and passing the received dataset to the target CICS application.

16. The method of claim 15, wherein:

the dataset is received and stored in a memory of the hardware computing platform;

removing the credential data includes at least one memory operation performed on the dataset stored in the memory.

* * * * *